US010013897B1

(12) United States Patent
Wien

(10) Patent No.: US 10,013,897 B1
(45) Date of Patent: Jul. 3, 2018

(54) TIME TRACKING LABELING SYSTEM AND METHOD TO MAKE IT

(71) Applicant: Abraham Wien, Boca Raton, FL (US)

(72) Inventor: Abraham Wien, Boca Raton, FL (US)

( * ) Notice: Subject to any disclaimer, the term of this patent is extended or adjusted under 35 U.S.C. 154(b) by 0 days.

(21) Appl. No.: 15/401,044

(22) Filed: Jan. 8, 2017

(51) Int. Cl.
*B32B 3/00* (2006.01)
*G09F 3/00* (2006.01)
*G04F 13/00* (2006.01)
*G09F 3/02* (2006.01)

(52) U.S. Cl.
CPC ............ *G09F 3/0291* (2013.01); *G04F 13/00* (2013.01); *G09F 2003/0222* (2013.01)

(58) Field of Classification Search
CPC ............................... G09F 3/0192; G09F 13/00
See application file for complete search history.

(56) References Cited

U.S. PATENT DOCUMENTS 3,042,264 A 7/1962 Trumbuil et al.
3,983,389 A 9/1976 Cowardin
4,086,477 A 4/1978 Cowardin
4,272,675 A 6/1981 Blanford
4,354,101 A 10/1982 Hester
4,414,468 A 11/1983 Laurer
4,421,978 A 12/1983 Laurer
5,124,538 A 6/1992 Lapinski
5,262,626 A 11/1993 Goren
5,442,164 A 8/1995 Adachi
5,457,308 A 10/1995 Spitz
5,495,097 A 2/1996 Katz
5,548,107 A 8/1996 Lapinski
5,667,303 A 9/1997 Arens et al.
5,821,519 A 10/1998 Lee
5,930,206 A 7/1999 Haas et al.
6,544,925 B1 4/2003 Prusik et al.
6,723,285 B2 4/2004 Chen
7,057,495 B2 6/2006 Debord et al.
7,416,122 B2 8/2008 Sato
7,808,861 B2 10/2010 Wien (Continued)

OTHER PUBLICATIONS

Souza Cruz et al., Oxygen scavenger: an approach to food preservation, in "Structure and Function of Food Engineering", book edited by Ayman Amer Eissa, ISBN 975-953-51-0695-.

(Continued)

*Primary Examiner* — Elizabeth E Mulvaney

(57) ABSTRACT

The present invention relates generally to the field of registers (class 235) and more specifically relates to a laminated time tracking device system (subclass 488) and the method to make it. The invention is a novel label designed in different layers (laminated) to keep track of time. The inventor commonly refers to the apparatus for preventing objects from falling into a ridge hole as the: "Time Label "T-Label". The T-Label disclosed in the instant application addresses the problem of communicating to a user an effective expiration date of a perishable good by providing a laminated structure comprising a bottom layer, a reactive layer, a sacrificial layer, a top layer, and a protecting layer; all assembled together. One of the novel aspects of the time tracking label disclosed in the present application is that it tracks the shelf life of a perishable good by looking at the Oxygen Transmission Rate (OTR) of the specific medium in which is stored thus providing a specific signal if a good has been oxidized rather than a "conventional" not verifiable expiration date.

19 Claims, 7 Drawing Sheets

(56) References Cited

U.S. PATENT DOCUMENTS

| | | | |
|---|---|---|---|
| 8,500,029 | B2 | 8/2013 | Wien |
| 8,668,140 | B2 | 3/2014 | Minivielle |
| 8,783,556 | B2 | 7/2014 | Minivielle |
| 8,851,365 | B2 | 10/2014 | Minivielle |
| 9,016,193 | B2 | 4/2015 | Minivielle |
| 9,033,245 | B2 | 5/2015 | Yates et al. |
| 9,061,486 | B2 | 6/2015 | Bi et al. |
| 9,069,340 | B2 | 6/2015 | Minivielle |
| 9,072,317 | B2 | 7/2015 | Minivielle |
| 9,171,061 | B2 | 10/2015 | Minivielle |
| 2008/0043804 | A1 | 2/2008 | Goldsmith et al. |
| 2009/0301382 | A1 | 12/2009 | Patel |
| 2010/0012018 | A1 | 1/2010 | Ribi |
| 2010/0149929 | A1 | 6/2010 | Braunberger |
| 2010/0209521 | A1 | 8/2010 | Schalkhammer |
| 2010/0263244 | A1 | 10/2010 | Tabirian |
| 2011/0174887 | A1 | 7/2011 | Johnson |
| 2013/0048736 | A1 | 2/2013 | Wien |
| 2014/0191025 | A1 | 7/2014 | Minvielle |

OTHER PUBLICATIONS

K. Khanah Mokwena & Juming Tang, Ethylene Vinyl Alcohol: A Review of Barrier Properties for Packaging Shelf Stable Foods, Critical Reviews in Food Science . . . ,52, 2012.

Valerie Renard, Saran PVDC Barrier Concepts for Demanding Coextrusion . . . , Dow Chemical Company, May 25, 2005.

TIME TRACKING LABELING SYSTEM AND METHOD TO MAKE IT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of pharmaceutical, food, chemical and biological derivatives and more specifically relates to a laminated time tracking device system and the method to make it. The invention is a novel label designed in different layers (laminated) to keep track of time. The inventor commonly refers to the apparatus for preventing objects from falling into a ridge hole as the: ""Time Label "T-Label".

2. Description of the Related Art

The invention disclosed in the present application generally refers to the field of registers and other devices to keep track of inventory over time. When dealing with relatively perishable goods keeping track of time is important. It is well known that agricultural produces lose their nutritional values quickly while still retaining a relatively fresh appearance. Similarly, chemicals used in the pharmaceutical industry may have a diminished efficacy due to the loss of active principles over time.

Expiration dates have long been introduced to provide guidance on the reduced freshness of different kinds of perishable goods, nevertheless as they are difficult to read and interpret people often tent to overlook at them. Various patents and published patent applications describes time tracking systems based on a label designed to change color over time. These patent documents include US 20030235119, US 20130048736, U.S. Pat. No. 7,808,861, U.S. Pat. No. 8,500,029, all to Wien, that are hereby incorporated by reference in the present application.

One of the technological limits found in the prior art is the lack of disclosure of a simple chemical mechanism that allows for a sudden, rapid change in color that does not allows for confusion or misunderstanding. Different solutions have been provided to address this problem but no-one to the full satisfaction of the inventor. Some of the solutions of the prior art in fact involve the use of dangerous etching metals (Patel US 20090301382) or overly complicated structures that are not readily understandable by the public (Yates U.S. Pat. No. 9,033,245). Therefore, there is the need in the art of a time tracking device that can provide visual effect to the public expressing boldly and clearly the freshness, quality and effectiveness of a good.

The inventive device disclosed in the present application is an improvement of the time management devices disclosed in the previous Wien's patent documents. It was designed to solve the problem of a realizing a label that can produce sudden change in color after being exposed to air and other atmospheric or environmental conditions for a certain time. It does solve this problem by providing a laminated structure comprising a bottom layer (1), a reactive, color changing layer (2), a sacrificial layer (3), a top layer (4), and a protecting layer (5); all assembled together. One of the novel aspects of the time tracking label disclosed in the present application is that it tracks the shelf life of a perishable good by looking at the Oxygen Transmission Rate (OTR) of the specific medium in which is stored thus providing a specific signal if a good has been oxidized rather than a "conventional" not verifiable expiration date.

Other attempts were certainly made to solve the above-mentioned problem but to the best knowledge of the inventor, no one has ever been described in a patent document or in a printed publication. None of the above inventions and patents of which the inventor is aware, taken either singly or in combination, is seen to describe the invention as claimed.

Ideally, time tracking label system should be pleasant to see and should convey the correct information without requiring any interpretative process on the side of the user. Additionally, the time tracking label system should be manufactured at a modest expense. Thus, a need exists for a reliable time tracking label to improve the solutions provided by the prior art over the above mentioned problems.

BRIEF SUMMARY OF THE INVENTION

In view of the foregoing disadvantages inherent in the known prior art, the present invention provides a novel apparatus for tracking the actual expiration of a perishable good as it relates to the oxygen transmission rate. The general purpose of the present invention, which will be described subsequently in greater detail, is to provide label for tracking the passing of time and communicating an expiration signal to a user comprising: a bottom layer (1) that serves as support to the reactive layer and that is made of a material that is impermeable to oxygen; a reactive color changing layer (2) containing a reactive mixture that suddenly changes color when it gets in contact with oxygen; a sacrificial layer (3) designed to scavenge oxygen therefore determining the amount of oxygen exposure. This layer is design to control the diffusion of oxygen into the reactive layer; and a top layer (4) also referred as smart or gate layer designed to filter out molecules other than oxygen. This layer, which works like an oxygen gate. The rate of oxygen permeation can be controlled by adjusting the composition (by doping with suitable materials) of this layer, and a protecting layer (5). Oxygen impermeable top layer: This is a protective layer which is impermeable to oxygen. The label can be activated by peeling off this layer. In a manufacturing system that creates the label on demand by the user, this protective layer can be replaced by an Ultra Violet (UV) coating designed to seal the label system and allow oxygen permeation by adjusting the level of seal.

In the label for tracking the passing of time and communicating an expiration signal to a user said bottom layer (1), said reactive layer (2), said sacrificial layer (3), and top layer (4) and a protecting layer (5) have all shape of a rectangular prism having the height much smaller than length and dept. Bottom layer (1), said reactive layer (2), said sacrificial layer (3), and top layer (4) and a protecting layer (5) are assembled consecutively one over the other one in their horizontal orientation.

The label for tracking the passing of time and communicating an expiration signal to a user of the present application is then designed to track the actual expiration date of a perishable good as it relates to its OTR since the reactive layer contains chemicals that quickly react with oxygen to provoke a sudden change in color. It is an additional objective of the device of the instant application to provide for a device that is inexpensive to design, produce, and set up, but that because of its ingenious design, conferring unexpected benefits, can be sold or licensed at a premium.

It is a separate objective of the present invention to raise the public awareness of the expiration and value of a perishable good by providing a sudden change in color on a label.

The present invention holds significant improvements to the field of tracking the effective expiration date of perishable goods. It is important to further characterize the laminated time tracking label of the present application as a tool that can be used in combination with different software programs. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a novel laminated time tracking label, constructed and operative according to the teachings of the present invention.

DETAILED DESCRIPTION

Figure 1:
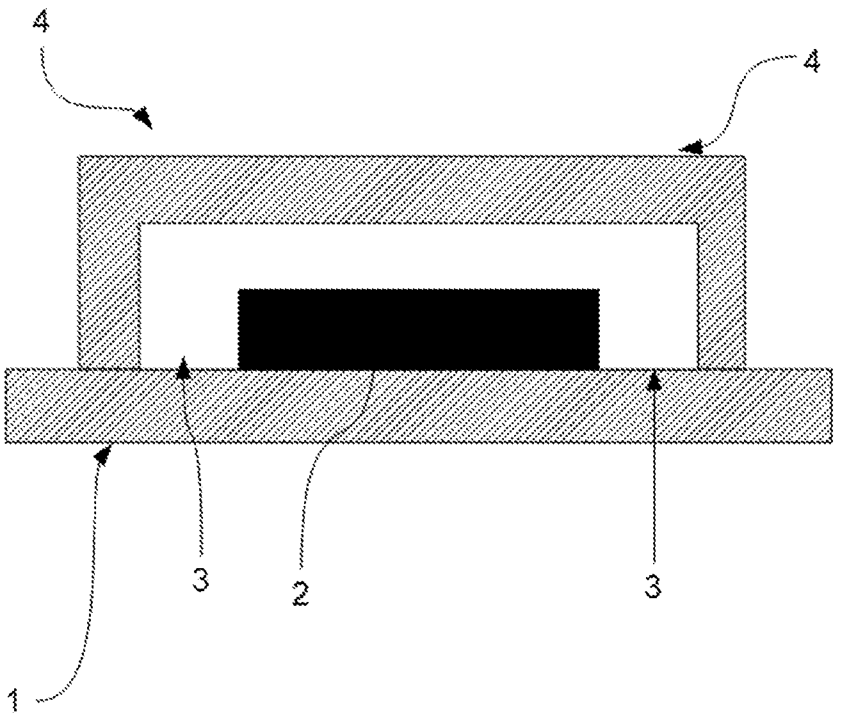
FIG. 1 shows a first cross sectional view illustrating the laminated time tracking label according to a first embodiment of the present only featuring an oxygen impermeable bottom layer (1), a reactive layer (2), a sacrificial layer (3), and a top layer (4).

As discussed above, embodiments of the present invention relate to the field of registers and more specifically relates to a laminated time tracking device.

Generally speaking the present application label for tracking the passing of time and communicating an expiration signal to a user comprising: featuring an oxygen impermeable bottom layer (1), a reactive layer (2), a sacrificial layer (3), and a top layer (4). In separate preferred embodiments a protecting layer (5) and a base layer (6) may be combined with the four basic layers described above. In a manufacturing system that creates the label on demand by the user, this protective layer can be replaced by an Ultra Violet (UV) coating designed to seal the label system and allow oxygen permeation by adjusting the level of seal.

For the purpose of the present application oxygen "impermeable" material suitable for the making of said bottom layer (1) include, but are not limited to: Poly Vinyl Alcohol (preferably bi-axially oriented or coated with Polyvinyldiene Chloride (PVDC), Ethilene Vinyl Alcohol (EVOH), Poly Vinyl Diene Chloride (PVDC), Nylon Resins (including Nylon MXD6), Isophthalic Acid Hexamethylendiamine Nylon, Terephthalic Acid Hexamethylendiamine Nylon, Amorphous Nylon, Polyacrylonitrile Copolymenrs, Polyethilene Terephtalate Polyester (PET), Polyethilene Naphtalate (PEN), Poly(Trimethylene Terephtalate) (PTT), Resorcinol Copolymers, Liquid Crystal Polymers (LCPS), Aliphatic Polyketones (PK), or Aluminum Oxide coated Polycarbonate.

Poly(vinyl alcohol) (PVOH, PVA, or PVA1) is a water-soluble synthetic polymer. It has the idealized formula [$CH_2CH(OH)$]. It is used in papermaking, textiles, and a variety of coatings. It is white and odorless. It is sometimes supplied as beads or as solutions in water. PVA is generally an atactic material that exhibits crystallinity. In terms of microstructure, it is composed mainly of 1,3-diol linkages [$—CH_2—CH(OH)—CH_2—CH(OH)—$] but a few percent of 1,2-diols [$—CH_2—CH(OH)—CH(OH)—CH_2$-] occur, depending on the conditions for the polymerization of the vinyl ester precursor. On the other hand if it can be synthesized addressing the orientation of its substituents the form of PVA exhibiting bi-axial orientation shows a better oxygen resistance.

PVA layers may be effective to block oxygen penetration even in extremely thin layers, beginning at 0.001 mm ($10^{-5}$ m), as they grow in thickness their functional range fades away because of practical consideration after a couple of millimeters, although thicker layer may be manufactured and put in place.

Resorcinol crystallizes from benzene as colorless needles that are readily soluble in water, alcohol, and ether, but insoluble in chloroform and carbon disulfide. It is the 1,3-isomer (or meta-isomer) of benzenediol with the formula $C_6H_4(OH)_2$. Aliphatic Polyketones are semicrystalline engineering thermoplastics with a wide range of properties. Aliphatic polyketones are semicrystalline thermoplastics composed of CO and olefins. The compounds are formed by the copolymerization of CO with an olefinic hydrocarbon, preferably ethylene. Small amounts of propylene, when added to the copolymer, improve the physical properties of the thermoplastic product, which is now produced on an industrial scale.

An UV coating is a surface treatment which either is cured by ultraviolet radiation, or which protects the underlying material from such radiation's harmful effects. Ultra-violet cured coatings can be applied over ink printed on paper and dried by exposure to UV radiation. UV coatings can be formulated up to 100% solids so that they have no volatile component that contributes to pollution. This high solids level also allows for the coating to be applied in very thin films. UV coatings can be formulated to a wide variety of gloss ranges. UV coating can be applied via most conventional industrial coating applications as well as by silk-screen.

Due to the normally high solids content of UV coating/varnish the surface of the cured film can be extremely reflective and glossy. Glass and plastic can both be coated to diminish the amount of ultraviolet radiation that passes through. Common uses of such coating include eyeglasses and automotive windows. Photographic filters remove ultraviolet to prevent exposure of the film or sensor by invisible light. UV curable coatings can be used to impart a variety of properties to polymeric surfaces, including glare reduction, wear or scratch resistance, anti-fogging, microbial resistance, chemical resistance. Coatings are usually applied to plastic substrates via spray, dip, roll, flow and other processes. UV-curable coatings are often specified for plastic parts because the process does not require heat, which can distort the plastic shape.

Chemicals that may be used for the Ultra Violet (UV) coating process include but are not limited to: Maleic anhydride, N-Methylethanolamine, 1,4-Butanediol, 1,5-Pentanediol, 1,6-Hexanediol, Neopentylglycol, Hydroxypivalic acid neopentylglycol ester, Trimethylolpropane, epsilon-caprolactone, polycapro-lactone, 3,4-Dihydro-2H-pyran, Butanediol divinyl ether, Diethyleneglycol divinyl ether, Triethyleneglycol divinyl ether, 1,4-Cyclohexane dimethanol divinyl ether, N-Vinyl-2-pyrrolidone, N-Vinyl caprolactam, 1,3-Divinylimidazolidin-2-one, and N-Vinylimidazole. Catalysts and additive that may be used in the UV coating mixture include either Vinylphosphonic acid or Vinylphosphonic acid dimethylester. The coating ensure that all the components of the label are sealed up and protected while not in use. This is the case, for example when the boxes are kept in storage before being filled out with their contents of pharmaceutical or medical compositions.

Sacrificial layer (3) is designed to react with oxygen, thus determining the time that it takes for the oxygen to reach reactive layer (2). The chemicals in reactive layer (2) are in extremely modest amount, therefore as soon as the atmospheric oxygen reaches it, they react provoking a sudden change in color. The time it takes for the oxygen to reach reactive layer (2) is determined by the thickness and the concentration of oxygen scavenging compounds that compose sacrificial layer (3). In one preferred embodiment of the label for tracking the passing of time and communicating an expiration signal to a user of the instant application said sacrificial layer (3) is composed by a mixture of glucose, sodium hydroxide, and polyvinyl alcohol.

Alternatively, other oxygen scavenger include elemental iron in its powdery form, different kind of iron oxides, that may or may not be mixed with sodium chloride. Ferrous carbonate mixed with a sodium halide is also an iron derived compound that may act as oxygen scavenger. Cobalt salts, including cobalt sulfites dissolved in glycol, may be used as powerful oxygen scavenger at room pressure and temperature. Activated carbon is also another suitable material for the sacrificial layer. The main shortfall of both iron and carbon is that both these compounds have a marked color, that may interfere with the overall look of the label. Organic oxygen scavengers suitable for the sacrificial layer include ascorbate, salicylic acid, sodium hydrogen carbonate, and ascorbic acid.

Other coating layer materials suitable for top layer (3) include Polystyrene, SARAN, and Polydimethylsiloxane. Polystyrene may be mixed with minor (1-10%) of toluene during the application and preparation process. Saran is the commercial name for a number of polymers made from vinylidene chloride (especially polyvinylidene chloride or PVDC), along with other monomers. Despite various literature claims that SARAN a Registered Trademark belonging to the DOW chemical company, the inventor could not verify the registration status of the mark SARAN at the time of writing the present application. SARAN therefore will be treated as a commercial name rather than a mark registered with the United States Patent Office. Since its accidental discovery in 1933, Saran has been used for a number of commercial and industrial products. When formed into a thin plastic film, the principal advantage of Saran, when compared to other plastics, is its very low permeability to water vapor, flavor and aroma molecules, and oxygen. This oxygen barrier retards food spoilage, while the film barrier to flavor and aroma molecules helps food retain its flavor and aroma.

Polystyrene (PS) is a synthetic aromatic polymer made from the monomer styrene. Polystyrene can be solid or foamed. General-purpose polystyrene is clear, hard, and rather brittle. It is an inexpensive resin per unit weight. It is a rather poor barrier to oxygen and water vapor and has a relatively low melting point. Polystyrene layers may range in between 1 to 1000 μm ($10^{-6}$ to $10^{-3}$ m). Polydimethylsiloxane (PDMS) belongs to a group of polymeric organosilicon compounds that are commonly referred to as silicones. PDMS is the most widely used silicon-based organic polymer, and is particularly known for its unusual rheological (or flow) properties. PDMS is optically clear, and, in general, inert, non-toxic, and non-flammable. It is also called dimethicone and is one of several types of silicone oil.

Reactive layer (2) is designed to quickly change color as soon as molecular oxygen reaches it. A first preferred composition for reactive layer (2) is a mix of glucose, as reducing agent, sodium hydroxide to create and maintain a basic pH, and methylene blue as color changing compound. Methylene blue (MB), also known as methylthioninium chloride, has many uses in biology and chemistry. It is a heterocyclic aromatic compound with the chemical formula $C_{16}H_{18}N_3SCl$. At room temperature it appears as a solid, odorless, dark green powder, that yields a blue solution when dissolved in water. The hydrated form has 3 molecules of water per unit of methylene blue. Methylene blue should not be confused with methyl blue, another histology stain, new methylene blue, nor with the methyl violets often used as pH indicators. While separate from oxygen MB exhibits a bright blue coloration, while when oxidized by atmospheric oxygen molecules in a alkaline environment it quickly turns black brown. Field experiments shown that functional mole to mole ratio between NaOH and MB may range in the field between $10^{-3}$ to $10^{3}$ with a preferred range of 0.1 to 1.

Dimethylformamide is an organic compound with the formula $(CH_3)_2NC(O)H$. Commonly abbreviated as DMF that has been found experimentally to improve the sudden color change of the reactive layer. Therefore a small to moderate amount to DMF may be included in the mixture of the reactive layer. This colorless liquid is miscible with water and the majority of organic liquids. DMF is a common solvent for chemical reactions. Dimethylformamide is odorless whereas technical grade or degraded samples often have a fishy smell due to impurity of dimethylamine. As its name indicates, it is a derivative of formamide, the amide of formic acid. DMF is a polar (hydrophilic) aprotic solvent with a high boiling point.

The label for tracking the passing of time and communicating an expiration signal to a user of the present application can be sold and made as a pre made label for a specific expiration time of the product. The novel design hereby disclosed can be activated on demand by peeling protective label (2). Alternatively, it can be manufactured by printing on demand the time sensitive label in an oxygen free environment. The printer will create specific time frame labels as required by the user to accommodate the specific life of the perishable product. This last embodiment of the label for tracking the passing of time and communicating an expiration signal to a user of the present application can be manufactured on demand by the label printing machine by virtue of the design and of the physical characteristics of each layer used such asn thickness, composition, and the like. In a manufacturing system that creates the label on demand by the user, this protective layer can be replaced by an Ultra Violet (UV) coating designed to seal the label system and allow oxygen permeation by adjusting the level of seal.

Figure 4:
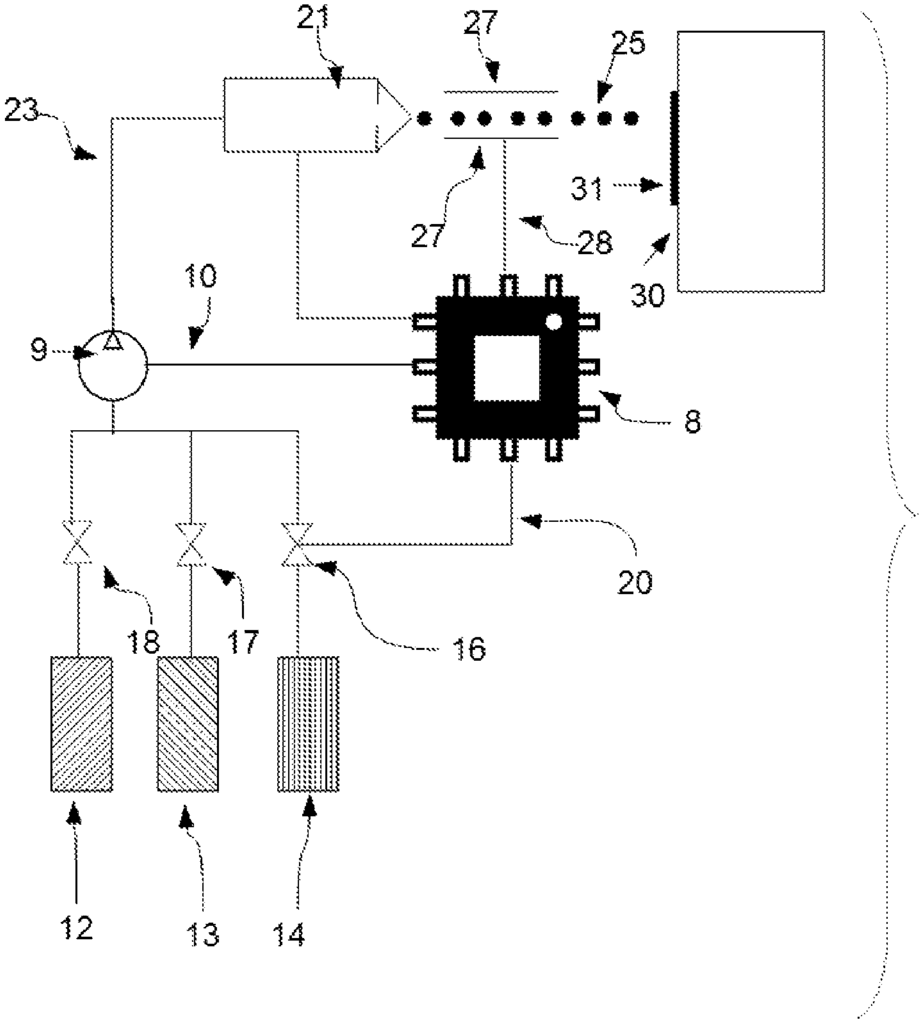
FIG. 4 is a diagrammatic view of the apparatus to produce a label for tracking the passing of time and communicating an expiration signal to a user comprising a bottom layer (1), a reactive layer (2), a sacrificial layer (3), a top layer (4), and an oxygen impermeable protective layer (5).
Figure 5:
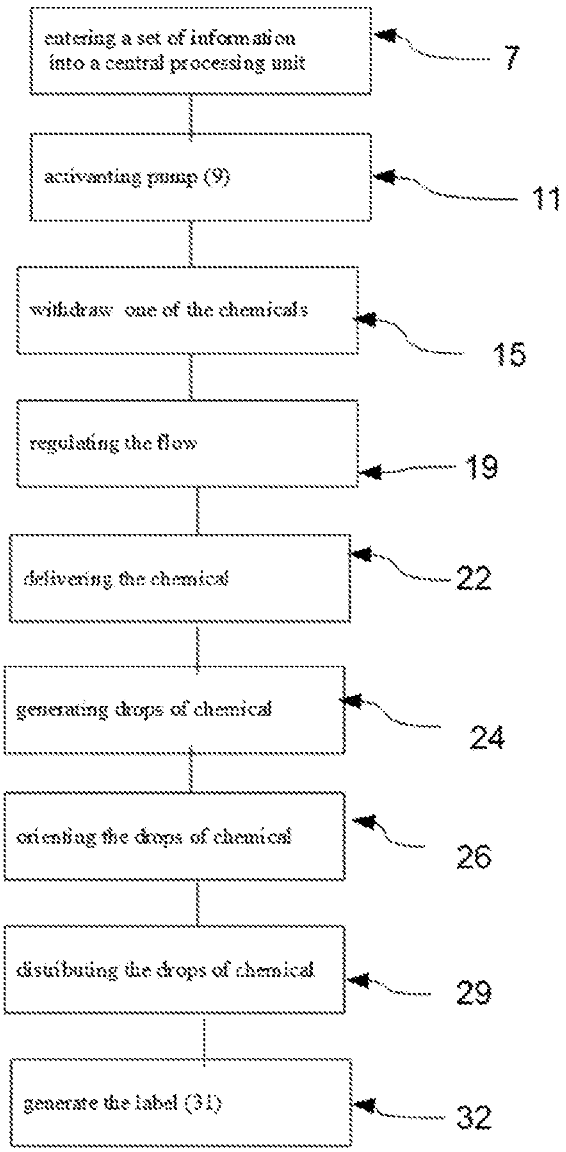
FIG. 5 describes the steps of the method to produce a label for tracking the passing of time and communicating an expiration signal to a user comprising a bottom layer (1), a reactive layer (2), a sacrificial layer (3), a top layer (4), and an oxygen impermeable protective layer (5) of the present application.

Referring now to FIGS. 4-5 the present application further discloses a method to produce a label for tracking the passing of time and communicating an expiration signal to a user comprising a bottom layer (1), a reactive layer (2), a sacrificial layer (3), a top layer (4), and an oxygen impermeable protective layer (5) including the steps of: entering (7) a set of information into a central processing unit (8) that controls pump (9) via electrical circuitry (10); activating (11) pump (9) to withdraw (15) one of the chemicals contained respectively in separate chemical reservoirs (12, 13 or 14); regulating (19) the flow of each chemical via a valve (16, 17, or 18) controlled by central processing unit (8) by means of electrical circuitry (20); delivering (22) the chemical to a drop generator (21) through tubing connection (23); generating (24) drops (25) of the selected chemical; orienting (26) the drops (25) of the selected chemical by having them passing in between high voltage plates (27) controlled by central processing unit (8) via electrical circuitry (28); distributing (29) the drops (25) of the selected chemical on support member (30) to generate (32) the label (31) by alternating appropriate layers of the different chemicals.

Because of the criticality of its dimensions, pump (8) may be a peristaltic pump. A peristaltic pump is a type of positive displacement pump used for pumping a variety of fluids. The fluid is contained within a flexible tube fitted inside a circular pump casing (though linear peristaltic pumps have been made). A rotor with a number of "rollers", "shoes", "wipers", or "lobes" attached to the external circumference of the rotor compresses the flexible tube. As the rotor turns, the part of the tube under compression is pinched closed (or "occludes") thus forcing the fluid to be pumped to move through the tube. Additionally, as the tube opens to its natural state after the passing of the cam ("restitution" or "resilience") fluid flow is induced to the pump. This process is called peristalsis and is used in many biological systems such as the gastrointestinal tract.

Figure 6:
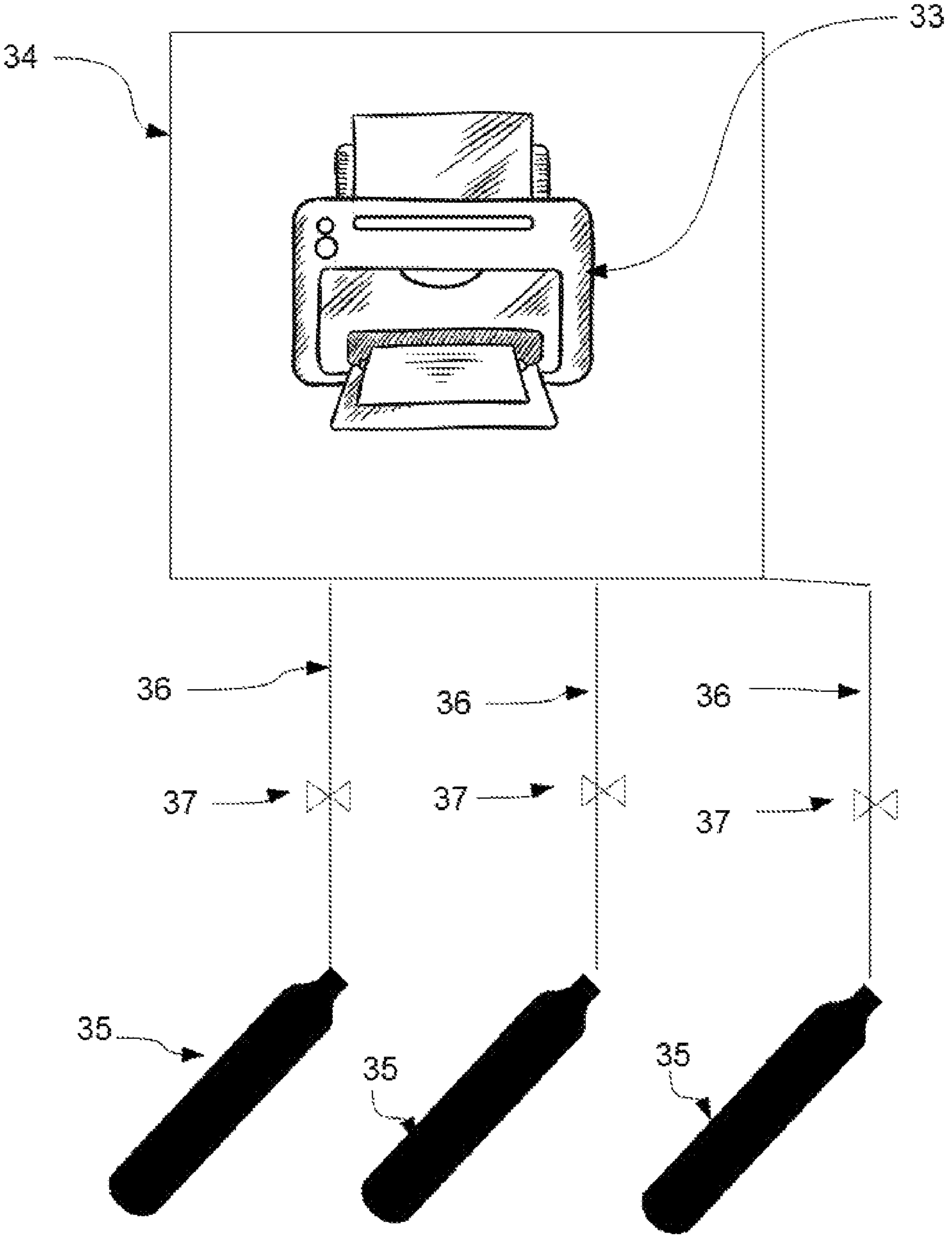
FIG. 6 illustrates the assembly needed to put in action the method to produce a label for tracking the passing of time and communicating an expiration signal to a user comprising a bottom layer (1), a reactive layer (2), a sacrificial layer (3), a top layer (4), and an oxygen impermeable protective layer (5) performed in an oxygen free environment by placing printing assembly (33) under a gas impermeable plastic tent (34) where the atmosphere is controlled by flushing oxygen free inert gases from a plurality of tanks (35) where said oxygen free inert gases may include nitrogen, helium, or propane.
Figure 7:
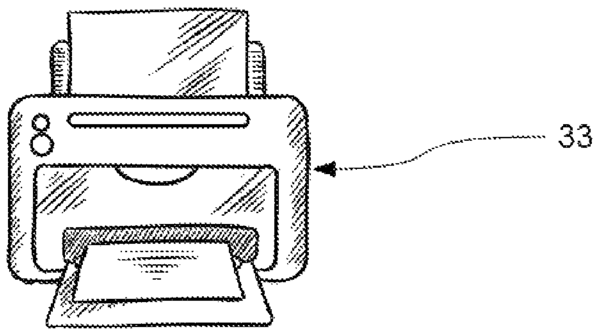
FIG. 7 illustrates the assembly needed to put in action the method to produce a label for tracking the passing of time and communicating an expiration signal to a user comprising a bottom layer (1), a reactive layer (2), a sacrificial layer (3), a top layer (4), and an oxygen impermeable protective layer (5) performed in presence of oxygen where plastic tent (34), gas tanks (35), tubing (36), and valves (37) are removed because not needed. The apparatus shown in FIG. 7 has the main advantage of simplicity over the one shown in FIG. 6.

As described in FIG. 6 the steps of the method to produce a label for tracking the passing of time and communicating an expiration signal to a user comprising a bottom layer (1), a reactive layer (2), a sacrificial layer (3), a top layer (4), and an oxygen impermeable protective layer (5) may be performed in an oxygen free environment by placing printing assembly (33) under a gas impermeable plastic tent (34) where the atmosphere is controlled by flushing oxygen free inert gases from a plurality of tanks (35) where said oxygen free inert gases may include nitrogen, helium, or propane. The connection between said plurality of tanks (35) and said gas impermeable plastic tent is ensured by gas tubing (36) and regulated by plurality of valves (37).

Figure 2:
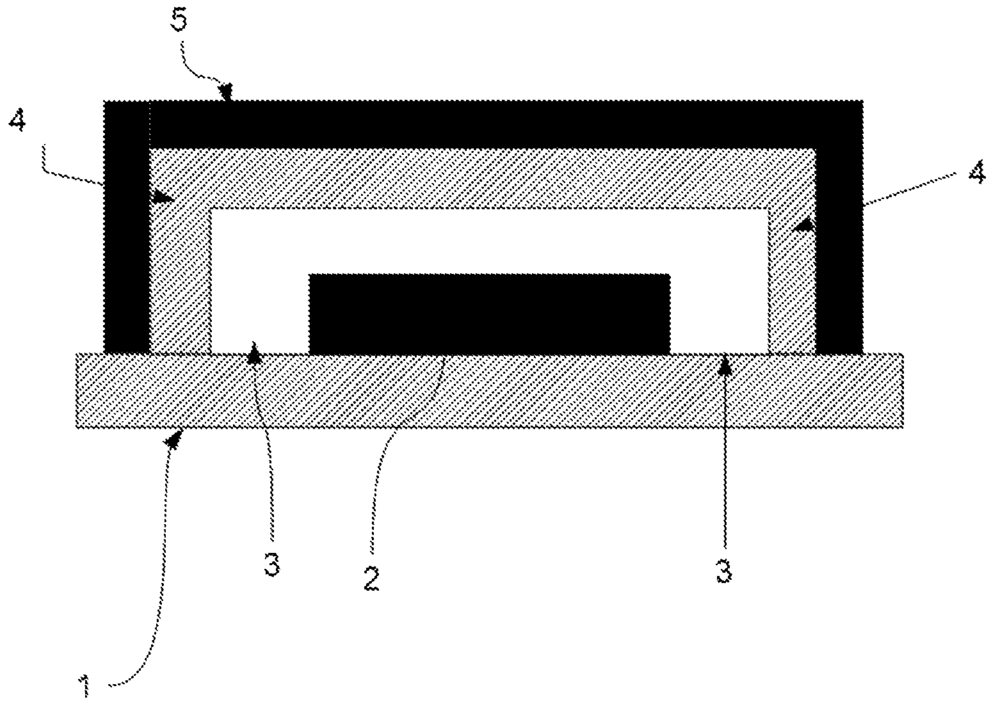
FIG. 2 shows a cross sectional view illustrating the laminated time tracking label according to a second embodiment of the present only featuring an oxygen impermeable bottom layer (1), a reactive layer (2), a sacrificial layer (3), a top layer (4), and a protecting layer (5). In a manufacturing system that creates the label on demand by the user, this protective layer can be replaced by an Ultra Violet (UV) coating designed to seal the label system and allow oxygen permeation by adjusting the level of seal. For UV is meant Ultra Violet (UV) light with wavelengths from 10 nm to 400 nm preferably in between 240 nm and 270 nm or in between 350 and 380 nm. Vacuum Ultra Violet VUV is a variety of UV light with wavelengths in between 10 nm and 200 nm. This very energetic radiation is absorbed by molecular oxygen while can propagate freely in a noble gas or nitrogen atmosphere. Therefore, the VUV radiation is preferably used in the embodiment of the present application operation in absence of oxygen.
Figure 3:
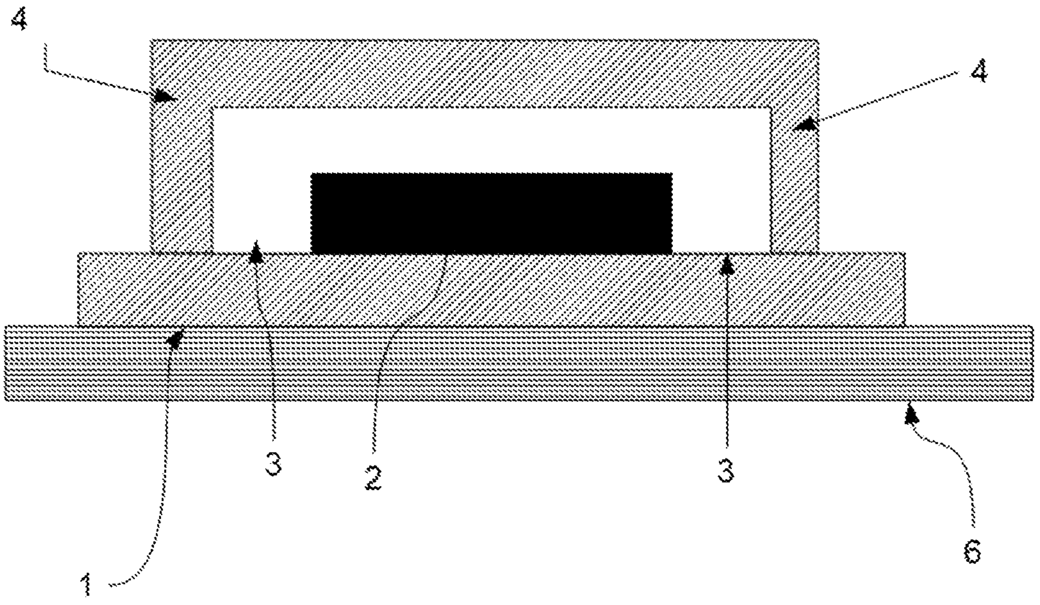
FIG. 3 shows a cross sectional view illustrating the laminated time tracking label according to a second embodiment of the present only featuring an oxygen impermeable bottom layer (1), a reactive layer (2), a sacrificial layer (3), a top layer (4), a protecting layer (5), and a base element (6). In a manufacturing system that creates the label on demand by the user, this protective layer can be replaced by an Ultra Violet (UV) coating designed to seal the label system and allow oxygen permeation by adjusting the level of seal.

Referring now to FIGS. 1-3, showing the label for tracking the passing of time and communicating an expiration signal to a user of the present application. It may be sold as kit comprising the following parts: at least one top layer at least one sacrificial layer; at least one reactive layer; at least one bottom layer; and at least one set of user instructions. The kit has instructions such that functional relationships are detailed in relation to the structure of the invention (such that the invention can be used, maintained, or the like in a preferred manner). The label for tracking the passing of time and communicating an expiration signal to a user of the present application may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A label for tracking the passing of time and communicating an expiration signal to a user comprising:

(a) a bottom layer;

(b) a reactive layer;

(c) a sacrificial layer; and (d) a top layer; where each of said bottom layer, said reactive layer, said sacrificial layer, and top layer is a rectangular prism; where said bottom layer, said reactive layer, said sacrificial layer, and top layer are assembled consecutively one over the other one in their horizontal orientation;

(e) Oxygen impermeable protective layer.

2. The label for tracking the passing of time and communicating an expiration signal to a user of claim 1 where said protective layer is sealed with cured UV coating material.

3. The label for tracking the passing of time and communicating an expiration signal to a user of claim 2 where said UV coating material is selected from the group consisting of 1,4-Butanediol, 1,5-Pentanediol, 1,6-Hexanediol, and, Butanediol divinyl ether.

4. The label for tracking the passing of time and communicating an expiration signal to a user of claim 3 where said UV coating material further comprises Vinylphosphonic acid.

5. The label for tracking the passing of time and communicating an expiration signal to a user of claim 3 where said UV coating material further comprises Vinylphosphonic acid dimethylester.

6. The label for tracking the passing of time and communicating an expiration signal to a user of claim 1 where said protective layer is made of a material selected from the group consisting of Poly Vinyl Alcohol, Ethilene Vinyl Alcohol, and Poly; Resorcinol Copolymers.

7. The label for tracking the passing of time and communicating an expiration signal to a user of claim 6 where the molecules of said Poly Vinyl Alcohol are bi-axially oriented.

8. The label for tracking the passing of time and communicating an expiration signal to a user of claim 1 where said bottom layer is made of a material selected from the group consisting of Poly Vinyl Alcohol, Ethylene Vinyl Alcohol, and, Poly Resorcinol Copolymers.

9. The label for tracking the passing of time and communicating an expiration signal to a user further of claim 1 further comprising base element consisting of a glass slide.

10. The label for tracking the passing of time and communicating an expiration signal to a user further of claim 1 where said reactive layer is composed of a mixture of glucose, sodium hydroxide, and methylene blue.

11. The label for tracking the passing of time and communicating an expiration signal to a user further of claim 10 where the mole to mole ratio between sodium hydroxide, and methylene blue is in the range of $10^{-3}$ to $10^{3}$.

12. The label for tracking the passing of time and communicating an expiration signal to a user further of claim 11 where the mole to mole ratio between sodium hydroxide, and methylene blue is in the range of $10^{-1}$ to 1.

13. The label for tracking the passing of time and communicating an expiration signal to a user further of claim 1 where said top layer is made of a material selected from the group consisting of Polystyrene, SARAN, and Polydimethylsiloxane.

14. The label for tracking the passing of time and communicating an expiration signal to a user further of claim 13 where said Polystyrene further comprises about 2% of toluene.

15. The label for tracking the passing of time and communicating an expiration signal to a user further of claim 1 where said Polystyrene is $10^{-6}$ to $10^{-3}$ m thick.

16. The label for tracking the passing of time and communicating an expiration signal to a user further of claim 1 where said sacrificial layer is composed by a mixture of glucose, sodium hydroxide, and polyvinyl alcohol.

17. The label for tracking the passing of time and communicating an expiration signal to a user further of claim 16 where said reactive layer further comprises Dimethylformamide.

18. A method to produce a label for tracking the passing of time and communicating an expiration signal to a user comprising a bottom layer, a reactive layer, a sacrificial layer, a top layer, and an oxygen impermeable protective layer including the steps of:

a. entering a set of information into a central processing unit that controls pump via electrical circuitry;

b. activating pump to c. withdraw one of the chemicals contained respectively in separate chemical reservoirs;

d. regulating the flow of each chemical via a valve controlled by Central Processing Unit by means of electrical circuitry;

e. delivering the chemical to a drop generator through tubing connection;

f. generating drops of the selected chemical;

g. orienting the drops of the selected chemical by having them passing in between high voltage plates controlled by central processing unit via electrical circuitry;

h. distributing the drops of the selected chemical on support member to i. generate the label by alternating appropriate layers of the different chemicals.

19. The method of claim 18 further comprising the step of performing all the steps in an oxygen free environment.

* * * * *